(12) United States Patent
Barbieux

(10) Patent No.: US 6,375,197 B1
(45) Date of Patent: Apr. 23, 2002

(54) CLAMPING CHUCK WITH SIX ARMS MOUNTED ON BALL JOINTS COMPENSATED TWO BY TWO

(75) Inventor: Jacques Barbieux, Louvres (FR)

(73) Assignee: Sandvik Tobler S.A., Louvres (FR)

( * ) Notice: Subject to any disclaimer, the term of this patent is extended or adjusted under 35 U.S.C. 154(b) by 0 days.

(21) Appl. No.: 09/549,540

(22) Filed: Apr. 14, 2000

(30) Foreign Application Priority Data

Apr. 15, 1999 (FR) .............................. 99 04716

(51) Int. Cl.⁷ .............................................. B23B 31/02
(52) U.S. Cl. ...................... 279/132; 279/106; 279/108
(58) Field of Search ................... 279/106, 108, 279/132, 130, 121

(56) References Cited

U.S. PATENT DOCUMENTS 3,082,015 A    3/1963   Hohwart et al.
3,365,206 A    1/1968   Hohwart et al.
5,174,179 A *  12/1992  Hiestand ...................... 82/165
6,206,382 B1 * 3/2001   Gonnocci .................... 279/132

FOREIGN PATENT DOCUMENTS

FR    2 248 901           5/1975
FR    2373351 A1 *        7/1978  ................ 279/132
FR    2720670 A1 *       12/1995

* cited by examiner

*Primary Examiner*—Steven C. Bishop
(74) *Attorney, Agent, or Firm*—Finnegan, Henderson, Farabow, Garrett & Dunner, L.L.P.

(57) ABSTRACT

The clamping chuck comprises six jaw carrier arms (4) that are operated two by two by one and the same compensator (5). Each compensator hinges with a pulling member (3) centered on the axis of the chuck and sliding axially in its main body (1) through the action of a traction rod (11). The pulling member is provided with pairs of wings (14a, 14b) extending on either side of the central portion of the compensator (5).

Application to clamping chucks for high speed machining.

6 Claims, 4 Drawing Sheets

CLAMPING CHUCK WITH SIX ARMS MOUNTED ON BALL JOINTS COMPENSATED TWO BY TWO

The invention lies within the technical field of jaw type clamping chucks, and it relates more especially to a chuck with six arms mounted on ball joints, compensated two by two.

There are known a certain number of workpiece clamping devices, for example chucks of the radial and axial clamping type but without compensated clamping, or again, chucks with one or more concentric or diameter-compensated jaws, of the radial clamping type, with or without axial clamping, with modifiable distribution between radial clamping and axial clamping, with compensation for said clamping types and distribution of the clamping force more or less equally for each jaw, as disclosed in document FR-A 2373 351.

More recently, modifications have been made to these systems by designing a clamping chuck permitting precise radial guiding of the jaw carriers in the body of the chuck, which also ensures their freedom to pivot axially with a view to optimum positioning of the jaws in contact with the workpiece for clamping. For this purpose, each jaw carrier is equipped with a member guided along a groove provided within the chuck, said guiding member being solely free to pivot axially in relation to the jaw carrier, as disclosed in document FR 2 720 670.

The three-jaw systems most commonly used do not, however, prevent the workpieces from being deformed under high speed machining conditions, which is why it was thought worthwhile to increase the number of points of contact between the chuck and the workpiece, to ensure better mating with its profile and avoid the risks of deformation. With this aim in mind, the Applicant has opted for a solution implementing six clamping jaws regularly distributed over the chuck, six arms mounted on ball joints and compensated two by two being provided.

The main object of the invention is thus a jaw type clamping chuck comprising several jaw carriers sliding in the body of the chuck through the action of a traction rod moving axially and comprising a mechanism converting this axial movement into a radial movement of the members for clamping of the workpiece effected by pivoting arms and a connection by truncated sphere and inclined plane, said clamping chuck comprising at least six jaw carrier arms which are actuated two by two by the same compensator, each compensator being articulated on a pulling member centered on the axis of the chuck and sliding axially in its main body through the action of the traction rod.

According to one particular feature of the invention, said compensator has two rectangular openings oriented along the radius of the chuck, the edges of the inner side of which form the ramp on which bears the plane face of the truncated sphere connected to the corresponding jaw carrier arm.

More precisely, the compensator hinges with the pulling member via a pin passing through a central hole in said compensator.

According to another particular feature of the invention, the pulling member is provided with at least three pairs of wings, with the wings extending on either side of the central portion of the compensator.

Other particular features and advantages of the invention will emerge from the following description of a non-limitative exemplary form of embodiment in which reference is made to the annexed drawings, wherein.

Figure 1:
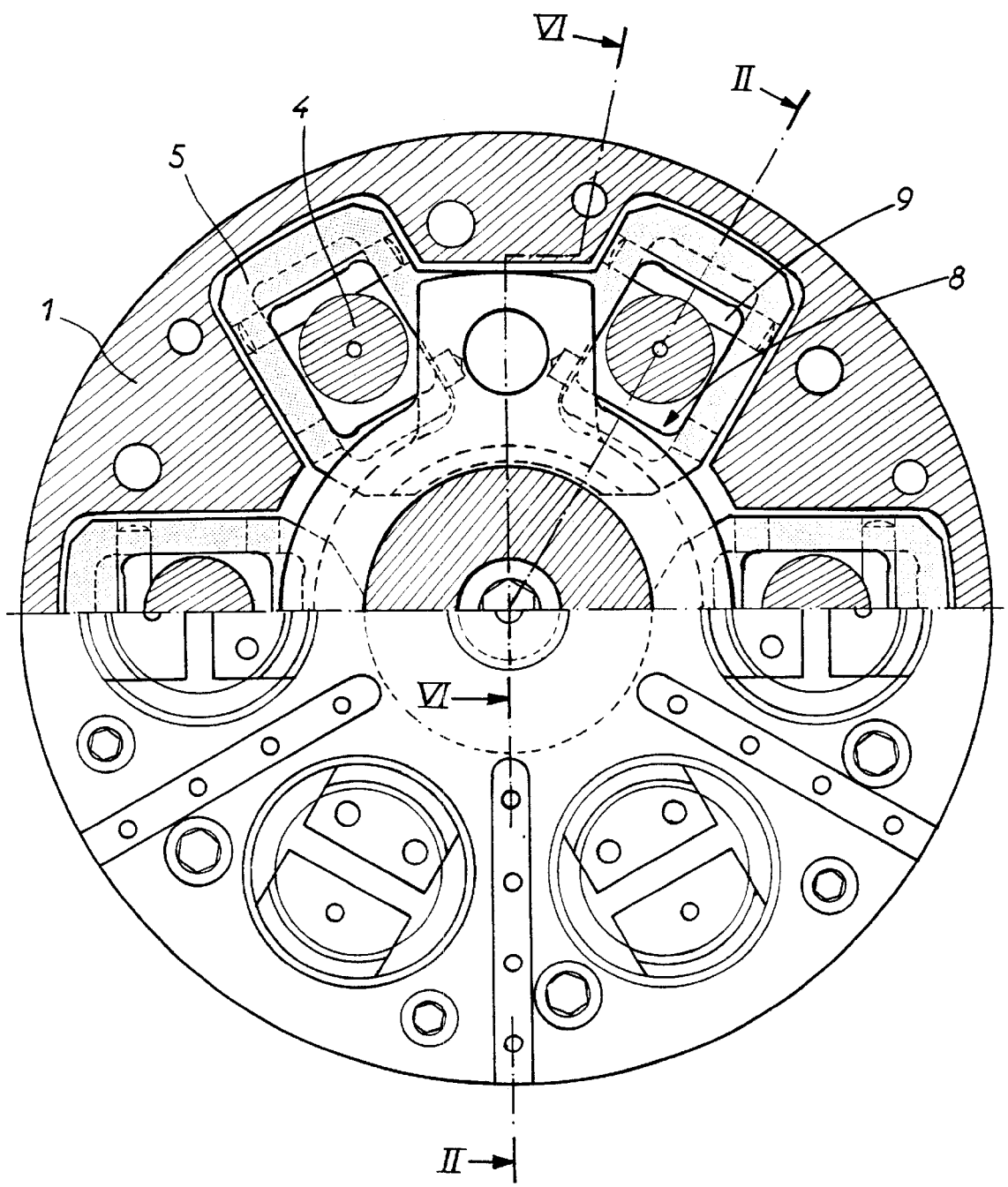
FIG. 1 is a transverse half cross-section of the chuck along line I—I of FIG. 2.
Figure 2:
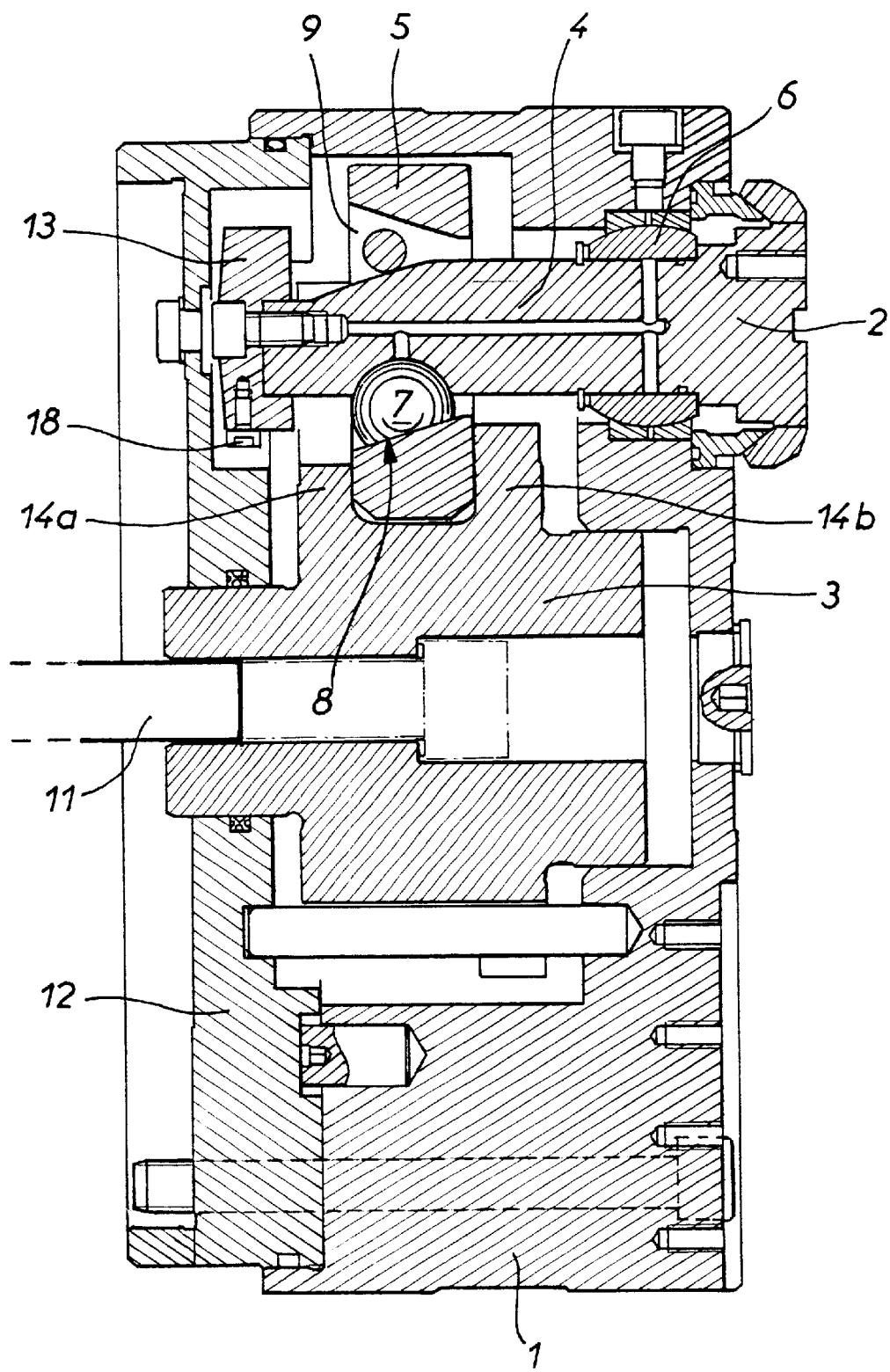
FIG. 2 is a cross-sectional view along line II—II of FIG. 1.
Figure 3:
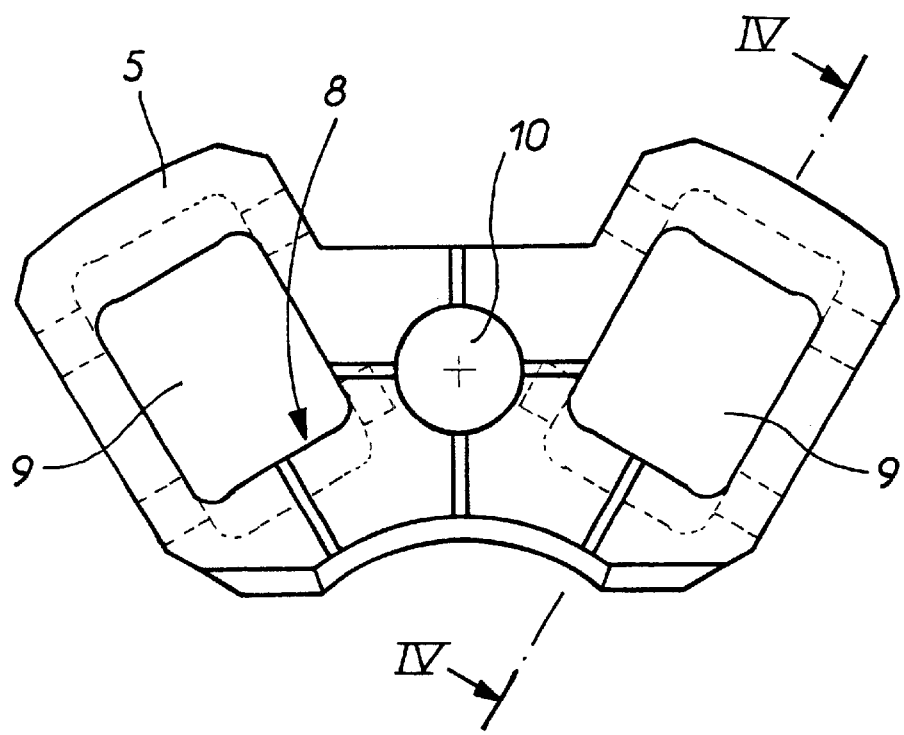
FIG. 3 is a front view of the compensator.
Figure 4:
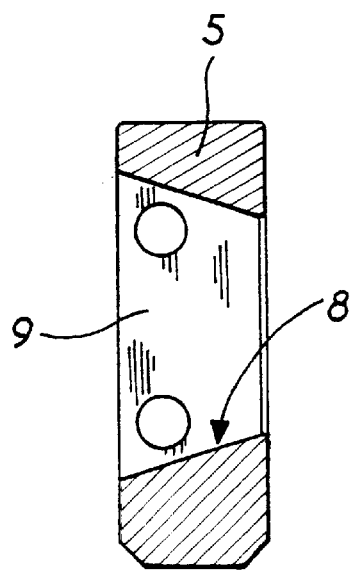
FIG. 4 is a cross-sectional view along line IV—IV of FIG. 3.

The clamping chuck shown in FIGS. 1 and 2 is equipped with six jaws 2 regularly spaced over the periphery of main body 1 of the chuck. Each jaw is mounted at the top of a jaw carrier arm 4 capable of pivoting inside the main body by means of a ball joint 6. The lower part of the arm is profiled to mate with the contour of a truncated sphere 7, the plane face of which bears on a ramp 8 formed by the edge of an opening 9 provided inside compensator 5, as can best be seen in FIGS. 3 and 4. Each compensator 5 is an arc-shaped piece pierced in its center by a cylindrical bore 10 and, on either side thereof, by two rectangular openings 9 oriented along the radius of the chuck, the edges of the inner side of which form ramp 8. Each compensator thus receives in the openings two jaw carrier arms 4, which are thus "compensated" two by two.

Figure 5:
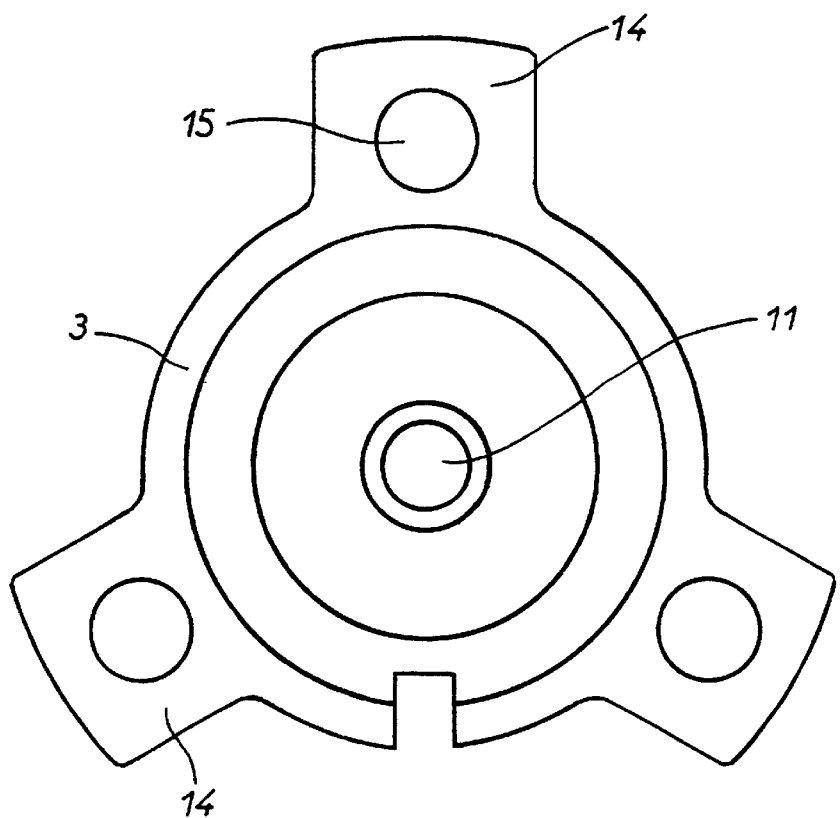
FIG. 5 is a front view of the pulling member.

Three compensators 5 are thus distributed over the main body of the chuck. They are articulated by means of a pin 17 co-operating with bore 10, on a pulling member 3 which is visible in FIG. 2 as well as FIGS. 5 and 6. Pulling member 3, centered on the axis of the chuck, is controlled by a traction rod 11, and it slides axially in a plate 12 fixed to the rear of main body 1. The pulling member is provided with three pairs of wings 14, with wings 14a and 14b extending on either side of the central portion of a compensator 5. Wings 14 are pierced by an opening 15 corresponding to opening 9 of the compensator and traversed by its pin 17.

Figure 6:
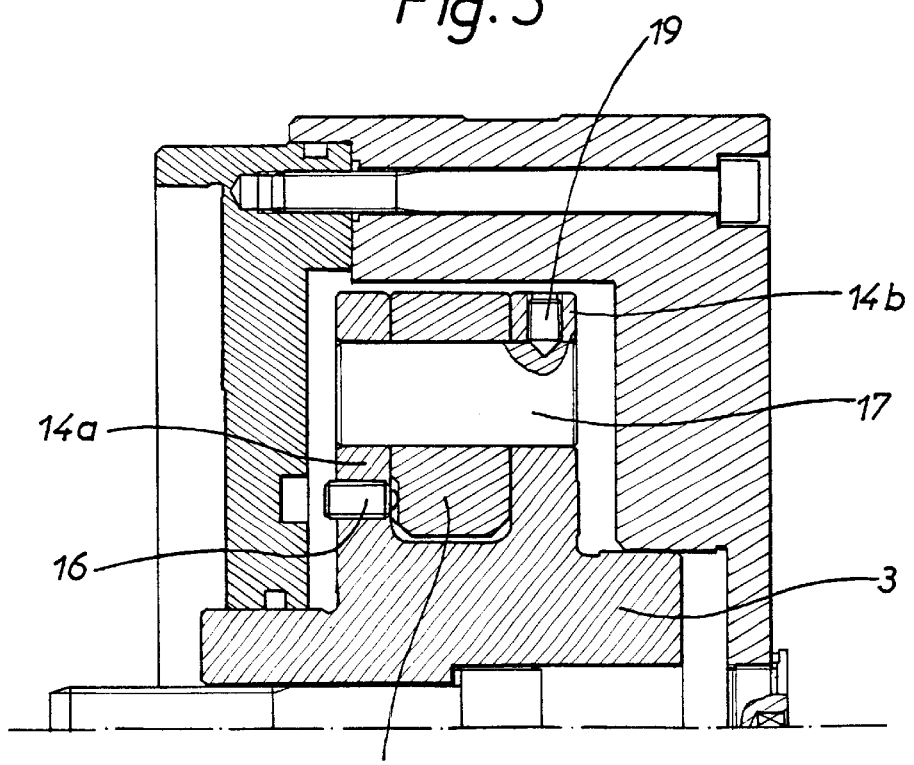
FIG. 6 is a cross-sectional view along line VI—VI of FIG. 1.

It can be seen from FIGS. 2 and 6 that compensator 5 is thus gripped between the wings (14a, 14b) of pulling member 3, and it will be understood that an axial movement of the pulling member is transmitted to the compensator and, consequently, to the two jaw carrier arms 4 that are controlled thereby. Each of the three compensator thus ensures the compensated opening and closing of two arms 4. Each of arms 4 is capable of pivoting inside the main body thanks to the ball joints 6, owing to the fact that sphere 7, when subjected to the movement of corresponding ramp 8, causes the arm to pivot.

Each arm 4 supports, on its rear end (left-hand part of FIG. 2) a weight 13 designed to compensate for the centrifugal effect of the jaws. A stop 18 is provided in the area of the weight for angular re-positioning of the jaw carriers when unclamping, and to ensure maximum admission of the workpiece when loading.

Satisfactory guiding and rigidity of the jaw carriers is ensured by the fact that the three compensator 5 are "on board" and integral with pulling member 3 in its axial movement.

With more particular reference to FIG. 6, it will be noted that a spring-biased pusher 16 is mounted on one of wings 14a of pulling member 3 and bears on compensator 5. It enables the latter to be held in a mean intermediate position while the jaws approach the workpiece. In addition, a needle screw 19 on the other wing 14b ensures that pin 17 is held in place.

What is claimed is:
1. Jaw type clamping chuck having a body and comprising a plurality of jaw carriers sliding in the body of the chuck through the action of a traction rod moving axially, said traction rod having a mechanism converting this axial move- ment into a radial movement of members for clamping a workpiece effected by pivoting arms and a connection by truncated sphere and inclined plane, the clamping chuck comprising at least six jaw carrier arms which are actuated two by two by a compensator, each compensator being articulated on a pulling member centered on the axis of the chuck and sliding axially in its main body through the action of the traction rod, the compensator having two rectangular openings oriented along the radius of the chuck, the edges of the inner side of which form a ramp on which bears a plane face of the truncated sphere connected to the corresponding jaw carrier arm, wherein the compensator hinges with the pulling member via a pin passing through a central hole in said compensator.

2. Clamping chuck according to claim 1, wherein the pulling member is provided with at least three pairs of wings, with the wings extending on either side of the central portion of the compensator.

3. Clamping chuck according to claim 2, wherein a spring-biased pusher is mounted on one of wings of the pulling member and bears on the compensator.

4. Clamping chuck according to claim 1 wherein a needle screw is mounted on a wing of the pulling member to ensure that the pin is held in place.

5. Clamping chuck according to claim 1, wherein each jaw carrier arm supports at its rear end a weight to compensate for the centrifugal effect of the jaws wherein a stop for the arms is provided in the area of the weight for angular re-positioning of the jaw carriers when unclamping.

6. Clamping chuck according to claim 2, wherein a needle screw is mounted on a wing of the pulling member to ensure that the pin is held in place.

* * * * *